US012139830B2

(12) United States Patent
Eklind et al.

(10) Patent No.: US 12,139,830 B2
(45) Date of Patent: Nov. 12, 2024

(54) METHOD FOR IN-LINE TREATMENT OF A THREAD AND A SYSTEM THEREFORE COMPRISING A TREATMENT UNIT AND A CONTROL UNIT CONFIGURED TO DETERMINE IF A MAINTENANCE SEQUENCE IS NEEDED

(71) Applicant: COLOREEL GROUP AB, Jönköping (SE)

(72) Inventors: Martin Eklind, Jönköping (SE); Joakim Staberg, Jönköping (SE)

(73) Assignee: COLOREEL GROUP AB, Jönköping (SE)

( * ) Notice: Subject to any disclaimer, the term of this patent is extended or adjusted under 35 U.S.C. 154(b) by 692 days.

(21) Appl. No.: 17/275,793

(22) PCT Filed: Aug. 28, 2019

(86) PCT No.: PCT/SE2019/050806
§ 371 (c)(1),
(2) Date: Mar. 12, 2021

(87) PCT Pub. No.: WO2020/055303
PCT Pub. Date: Mar. 19, 2020

(65) Prior Publication Data

US 2022/0048288 A1 Feb. 17, 2022

(30) Foreign Application Priority Data

Sep. 15, 2018 (SE) .................................... 1851095-8

(51) Int. Cl.
*B41J 2/165* (2006.01)
*B41J 3/407* (2006.01)
(Continued)

(52) U.S. Cl.
CPC .......... *D04B 35/22* (2013.01); *B41J 2/16517* (2013.01); *B41J 3/4078* (2013.01);
(Continued)

(58) Field of Classification Search
None
See application file for complete search history.

(56) References Cited

U.S. PATENT DOCUMENTS 5,565,898 A * 10/1996 Sakuma ................. B41J 2/1652 347/30
5,671,614 A 9/1997 Masahiro
(Continued)

FOREIGN PATENT DOCUMENTS

CN 1205272 A 1/1990
CN 1522860 A 8/2004
(Continued)

OTHER PUBLICATIONS

International Search Report from PCT/SE2019/050806, dated Nov. 1, 2019, pp. 1-5.
(Continued)

*Primary Examiner* — Binu Thomas
(74) *Attorney, Agent, or Firm* — Robinson & Cole LLP

(57) ABSTRACT

A system for in-line treatment of thread for use with a thread consuming device is provided. The system includes a treatment unit including at least a first and a second print head each being configured to dispense one or more coating substances onto the at least one thread when activated; and a control unit configured to determine if a maintenance sequence is to be performed on at least the first print head, and if so schedule said maintenance sequence on at least the first print head. A method is further provided.

20 Claims, 9 Drawing Sheets

(51) Int. Cl.
*B41J 11/00* (2006.01)
*B65H 51/20* (2006.01)
*D04B 35/22* (2006.01)
*D05B 67/00* (2006.01)
*D05C 11/24* (2006.01)
*D06B 11/00* (2006.01)
*D06P 5/30* (2006.01)

(52) U.S. Cl.
CPC ........... *B41J 11/0015* (2013.01); *D05B 67/00* (2013.01); *D05C 11/24* (2013.01); *D06B 11/0023* (2013.01); *B41J 2002/16573* (2013.01); *B41J 2002/16582* (2013.01); *B65H 51/20* (2013.01); *D06P 5/30* (2013.01)

(56) References Cited

U.S. PATENT DOCUMENTS

| | | | | |
|---|---|---|---|---|
| 6,179,403 | B1 * | 1/2001 | Xie | B41J 2/16517 347/23 |
| 6,189,989 | B1 * | 2/2001 | Hirabayashi | D05C 11/24 427/288 |
| 6,938,971 | B2 * | 9/2005 | Gom z | B41J 2/1652 347/14 |
| 9,296,237 | B2 | 3/2016 | Groenen et al. | |
| 9,403,367 | B2 | 8/2016 | Reder et al. | |
| 11,305,543 | B2 * | 4/2022 | Fort Filgueira | B41J 2/16535 |
| 2001/0038408 | A1 | 11/2001 | Codos et al. | |
| 2007/0204775 | A1 | 9/2007 | Masao et al. | |
| 2008/0314276 | A1 * | 12/2008 | Gothait | B41J 2/2139 101/484 |
| 2008/0316237 | A1 | 12/2008 | Jeon | |
| 2014/0002525 | A1 | 1/2014 | Takeishi | |
| 2014/0028748 | A1 | 1/2014 | Hudd et al. | |
| 2017/0046104 | A1 * | 2/2017 | Van Vonderen | B41J 2/165 |
| 2017/0253035 | A1 | 9/2017 | Satoru | |
| 2018/0043690 | A1 | 2/2018 | Hitoshi et al. | |

FOREIGN PATENT DOCUMENTS

| | | | |
|---|---|---|---|
| CN | 200996095 | Y | 12/2007 |
| CN | 101663171 | A | 3/2010 |
| CN | 107709649 | A | 2/2018 |
| DE | 2204751 | A1 | 8/1973 |
| DE | 102010053085 | A1 | 6/2012 |
| EP | 0353963 | A1 | 2/1990 |
| EP | 2537679 | A1 | 12/2012 |
| GB | 2324541 | A | 10/1998 |
| JP | H06305129 | A | 11/1994 |
| JP | H07214766 | A | 8/1995 |
| JP | 2002200379 | A | 7/2002 |
| JP | 2005186419 | A | 7/2005 |
| JP | 2009273675 | A | 11/2009 |
| JP | 2014100892 | A | 6/2014 |
| JP | 2016172378 | A | 9/2016 |
| JP | 2017159456 | A | 9/2017 |
| JP | 6305129 | B2 | 4/2018 |
| WO | 2010125129 | A1 | 11/2010 |
| WO | 2013039447 | A1 | 3/2013 |
| WO | 2016204686 | A1 | 12/2016 |
| WO | 2016204687 | A1 | 12/2016 |
| WO | 2017200473 | A1 | 11/2017 |
| WO | 2018044222 | A1 | 3/2018 |

OTHER PUBLICATIONS

Examination Report issued in corresponding IN Application No. 202117017001, dated Aug. 23, 2022, pp. 1-6.

* cited by examiner

METHOD FOR IN-LINE TREATMENT OF A THREAD AND A SYSTEM THEREFORE COMPRISING A TREATMENT UNIT AND A CONTROL UNIT CONFIGURED TO DETERMINE IF A MAINTENANCE SEQUENCE IS NEEDED

CROSS REFERENCE TO RELATED APPLICATIONS

The instant application is a U.S. National Stage application of and claims priority to PCT/SE2019/050806, filed on Aug. 28, 2019, which is a PCT application of and claims priority to SE Application No. 18510956-8, filed on Sep. 15, 2018, the subject matter of both aforementioned applications are hereby incorporated by reference in their entireties.

TECHNICAL FIELD

The present invention relates to the technical field of thread consuming devices. In particular, the present invention relates to a system comprising a treatment unit to be used in association with such thread consuming device.

BACKGROUND

It has been suggested to provide thread consuming devices, such as embroidery machines or the like, with in-line apparatuses designed to provide the thread with a certain treatment. Such in-line apparatuses could e.g. be used to colour the thread, whereby multiple colour nozzles could replace the current use of multiple pre-coloured threads when producing multi-coloured patterns using embroidery machines. In prior art systems where threads of different colours are used, one thread, having a first specified colour, is used for some stitches while another thread, having a second specified colour, is used for other stitches.

In order to eliminate the obvious drawbacks of the requirement of multiple threads of different colours, the present applicant has filed several patent applications on the technique of in-line colouring of thread, such as WO2016204687 and WO2016204686. The proposed solutions provide improvements in terms of colour quality and also reduces the complexity of the thread consuming device.

However, in order to further improve the quality and efficiency of the in-line colouring of threads it would be advantageous if the in-line colouring apparatus could be able to more efficiently perform maintenance of one or several nozzles in the in-line colouring apparatus.

SUMMARY

An object of the present invention is therefore to provide a solution overcoming the disadvantages of prior art. More specifically, the present invention provides a solution where the system for in-line treatment of a thread is configured to determine when a maintenance sequence is needed for one or plurality of nozzles, and based on said determination perform a maintenance sequence.

In a first aspect, a system for in-line treatment of thread for use with a thread consuming device is provided. The system comprises at least two print heads each being configured to dispense one or more coating substances onto the at least one thread when activated, a control unit configured to determine if a maintenance sequence is to be performed on at least the first print head, and if so, schedule said maintenance sequence on at least the first print head.

The control unit may be configured to perform maintenance of at least one print head without stopping the thread consumption of the thread consuming device. Being able to perform maintenance without stopping the thread consumption of the thread consuming device has several benefits since it increases the effectivity and reduces the need of an operator. The system thus provides the effect of being able to perform maintenance without interfering with the thread consuming device.

The system may have one or more print heads arranged in an operation mode, simultaneous as one or more print heads are arranged in a maintenance mode. The control unit may be further configured to perform said maintenance on the scheduled time.

The control unit may further be configured to receive the current operating speed of the thread consuming device, and determine if a maintenance sequence is to be performed at least based on said current operating speed.

The control unit may further be configured to receive the thread consumption of the thread consuming device, and determine if a maintenance sequence is to be performed at least based on said thread consumption.

The control unit may further be configured to determine if a maintenance sequence is to be performed at least based on a predetermined operating pattern.

The control unit may further be configured to determine if a maintenance sequence is to be performed at least based on an estimated consumption of the coating sub stance.

The control unit may further be configured to determine a time interval for said maintenance, and to determine if a maintenance sequence is to be performed at least based on said time interval.

In one embodiment, the maintenance sequence is performed without stopping the thread consumption of the thread consuming device.

The control unit may further be configured to perform a maintenance sequence of at least the first print head by moving said first print head from a first position to a second position thereby deactivating said print head from dispensing a coating substance onto the at least one thread.

In one embodiment, at least the second print head is arranged in the first position while at least the first print head is arranged in the second position. The first position may be an operational position and the second position may be a maintenance position.

In one embodiment, each print head comprises a plurality of nozzles at different positions relative the at least one thread, said at least one thread being in motion in use, and each nozzle being configured to dispense one or more coating substances onto the at least one thread when activated.

The control unit may further be configured to alter the number of active nozzles based on the operation speed of the thread consuming device and/or the operation speed of the treatment unit.

The control unit may further be configured to alter the number of active nozzles based on the operation based on features of the coating substance.

The nozzles may be inkjet nozzles.

The system according to the first aspect may further comprise a thread consuming device.

The thread consuming device may be an embroidery machine, a sewing machine, a knitting machine, a weaving machine, a tufting machine, a thread winding machine, and or any combination thereof.

The system further comprises a thread buffer system being arranged downstream the at least two print heads.

The control unit may further be configured to fill up the thread buffer system when it is determined that a maintenance sequence is to be performed.

The system may further comprise a thread feeder arranged upstream of the print heads and wherein the control unit is configured to stop the thread feeder once the control unit has determined that a maintenance sequence is to be performed.

In one embodiment, during the maintenance sequence, the thread consuming device is consuming thread from the buffer.

In a second aspect, a method for in-line treatment of at least one thread for use with a thread consuming device is provided. The method comprises providing a treatment unit comprising at least a first and a second print head each being configured to dispense one or more coating substances onto the at least one thread when activated, and providing a control unit configured to determine if a maintenance sequence is to be performed on at least the first print head, and if so schedule said maintenance sequence on at least the first print head.

The method may further comprise the step of performing the scheduled maintenance sequence.

In a third aspect, a system for in-line treatment of thread for use with a thread consuming device is provided. The system comprises at least one discharge device being configured to dispense one or more coating substances onto the at least one thread when activated, and a control unit configured to schedule maintenance of said at least one discharge device without stopping the thread consumption of the thread consuming device. The system further comprising a thread buffer system being arranged downstream the at least one discharge device and a control unit. The control unit is further configured fill up the buffer system when it is determined that a maintenance sequence is to be performed.

The system may further comprise a thread feeder arranged upstream of the discharge device and wherein the control unit is configured to determined that a maintenance sequence is to be performed, and to stop the thread feeder once the control unit has determined that a maintenance sequence is to be performed.

During the maintenance sequence, the thread consuming device may be consuming thread from the buffer.

Definitions

Thread consuming device is in this context any apparatus which in use consumes thread. It may e.g. be an embroidery machine, weaving machine, sewing machine, knitting machine, weaving machine, a tufting machine, a thread winding machine or any other thread consuming apparatus which may benefit from a surface treatment or coating or any other process involving subjecting the thread to a substance, such as dying.

Treatment is in this context any process designed to cause a change of the properties of a thread. Such processes include, but are not limited to, colouring, wetting, lubrication, cleaning, fixing, heating, curing, dying, etc.

Thread is in this context a flexible elongate member or substrate, being thin in width and height direction, and having a longitudinal extension being significantly greater than the longitudinal extension of any parts of the system described herein, as well as than its width and height dimensions. Typically, a thread may consist of a plurality of plies being bundled or twisted together. The term thread thus includes a yarn, wire, strand, filament, etc. made of various materials such as glass fibre, wool, cotton, synthetic materials such as polymers, metals, polyester, viscos, or e.g. a mixture of wool, cotton, polymer, or metal or any combination thereof.

Within this specification, all references to upstream and/or downstream should be interpreted as relative positions during normal operation of the thread consuming device, i.e. when the device is operating to treat an elongated substrate, such as a thread, continuously moving through the device in a normal operating direction. Hence, an upstream component is arranged such that a specific part of the thread passes it before it passes a downstream component.

BRIEF DESCRIPTION OF THE DRAWINGS

Embodiments of the invention will be described in the following description of the present invention; reference being made to the appended drawings which illustrate non-limiting examples of how the inventive concept can be reduced into practice.

DETAILED DESCRIPTION

An idea of the present invention is to provide a system and method for distributing a coating substance onto a thread in a controlled manner, for use in association with a thread consumption device. Starting in FIG. 1*a* a schematic view of system 10 for in-line treatment of thread is shown. The system 10 comprises a treatment unit 100 for dispensing one or more coating substances onto at least one thread. The system 10 further comprises at least one thread consuming device 15, which may e.g. be in the form of one or several embroidery machine(s), a weaving machine(s), a sewing machine(s), knitting machine(s), a tufting machine(s), a thread winding machine(s) etc. The system thereby forms a thread consuming unit, including the at least one thread consuming device 15 and the treatment unit 100. It should be noted that more than one thread can be used in the thread consuming device(s).

It should be noted that several aspects of a system are described within this specification, and they do not require the inclusion of the thread consuming device 15. As will be further understood from the following, for all embodiments the system for in-line treatment of thread requires a treatment unit 100, to be used with a thread consuming device 15.

Figure 1A:
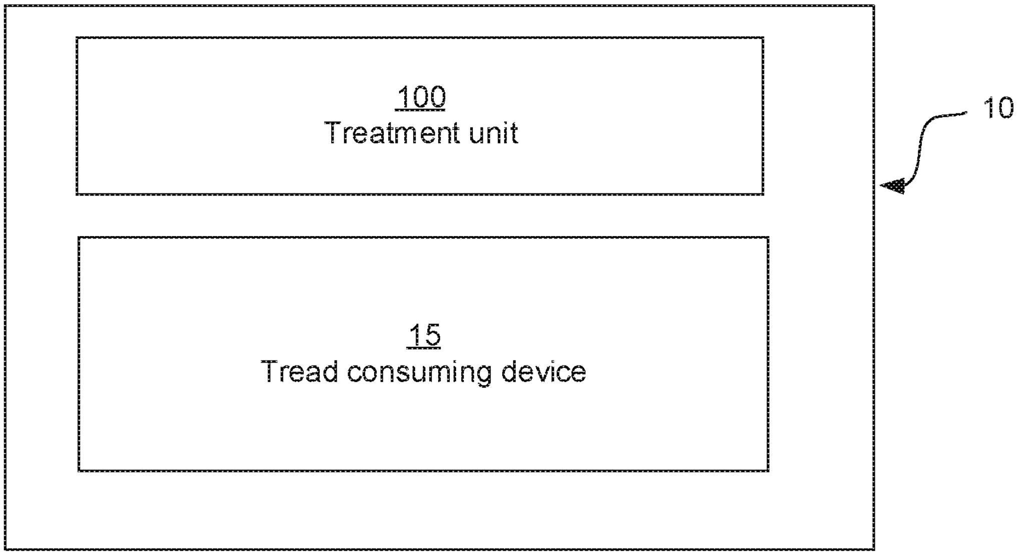
FIG. 1*a* is a schematic view of a system for in-line treatment of thread according to an embodiment.
Figure 1B:
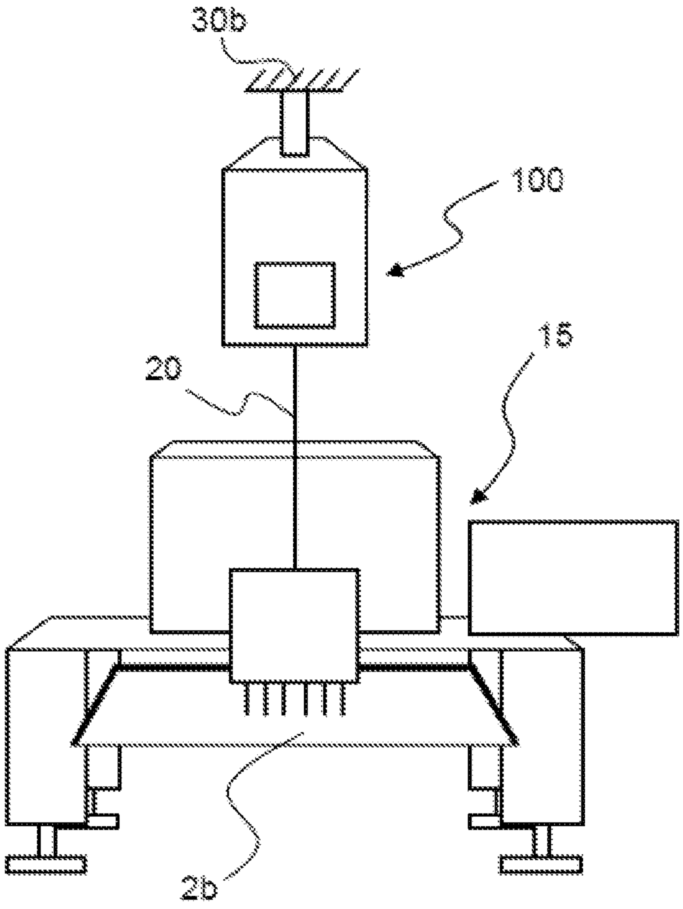
FIG. 1*b* is a perspective view of a system having a thread consuming device and a treatment unit according to an embodiment.

Now turning to FIG. 1*b* the thread consuming device 15 is exemplified as an embroidery machine, here illustrated as a single-head embroidery machine, being equipped with a treatment unit 100. The embroidery machine 15 comprises a moveable stage 2*b* carrying the fabric to be embroidered. During operation the moveable stage 2*b* is controlled to rapidly change its position in the X and Y direction (i.e. in this case the horizontal plane, but it could also be e.g. in the vertical plane).

The treatment unit 100 allows the embroidery machine 15 to operate without the provision of uniquely pre-coloured threads, as is required for conventional embroidery machines. Instead, the treatment unit 100 provides in-line colouring of a thread 20 in accordance with predetermined colouring patterns, such that a coloured embroidery can be produced. The treatment unit thus replaces individual thread reels as is present in prior art systems.

As is shown in FIG. 1*b* the only connection between the treatment unit 100 and the embroidery machine 15 is the thread 20, as well as electrical connections (not shown). The treatment unit 100 is thus provided as a stand-alone unit having no mechanical connection with the moveable stage 2*b*.

In an optional embodiment, the stand-alone treatment unit 100 is mounted to the thread consuming device 15 via a suspension arrangement for reducing the transmission of vibrations to the treatment unit 100.

The thread consuming device 15 is arranged to make stitches into a substrate. In this context, a stitch may for example be a single turn of thread, a single loop of thread, a single turn of yarn or a single loop of yarn. Stitches may for example be applied using sewing, knitting, embroidery, crochet and/or needle lace-making. The substrate is preferably a textile, fabric or cloth. In one embodiment, the substrate has a fixed set of properties, for example a specific thickness and elasticity constant.

A plurality of stitches forms a pattern in the form of an object or a design onto the substrate. The object may be a figure, shape, text, emblem, symbol, colour gradient or the like. The object may be a logotype or a company name, for example in the form of an embroidery. The operator of the system 10 chooses an object or design to be applied to the substrate, and thus chooses a predetermined stitch pattern. The stitch pattern selected can also be referred to as the driving pattern of the thread consuming device 15.

Figure 2:
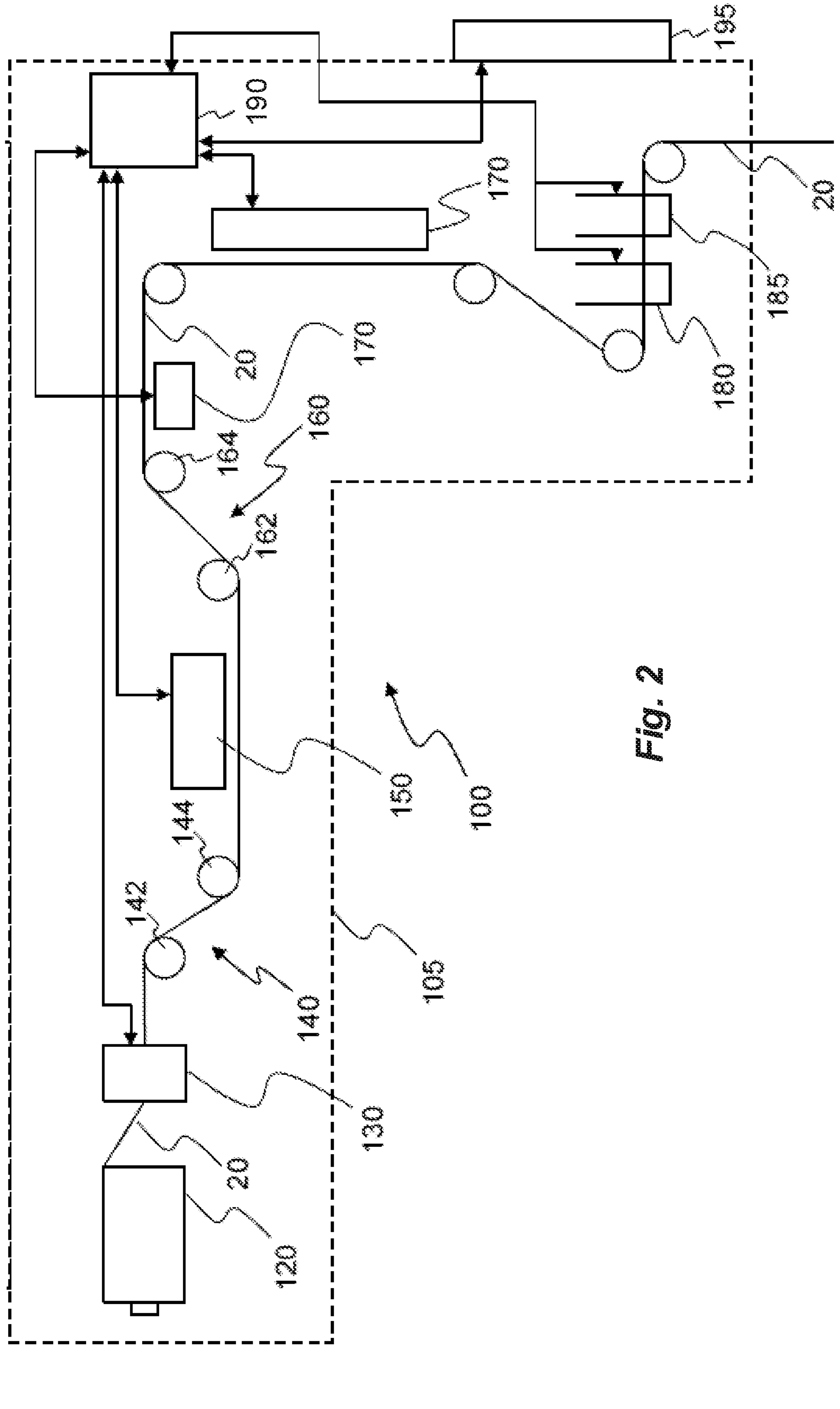
FIG. 2 is a schematic view of a treatment unit for use with a system according to an embodiment.

The various components of the treatment unit 100 are shown in FIG. 2. As can be seen in FIG. 2 a majority of the components are arranged inside a housing 105. Immediately downstream the thread reel 120 a thread feeder 130 may be arranged, which is configured to pull the thread forward through the treatment unit 100. The thread feeder 130 is not described further herein, but for a more general understanding the thread feeder 130 receives and forwards the thread 20. For this, the thread feeder 130 may be controlled by a control unit 190 described further below. After passing the thread feeder 130 the thread 20 engages with a thread guiding device 140. The thread guiding device 140, which may e.g. be in the form of one or more guiding rollers 142, 144 or other suitable means, is ensuring that the thread 20 is aligned with one or more treatment nozzles forming part of at least one discharge device 150.

The discharge device 150 is configured to discharge treatment substance, such as a colouring substance, onto the thread 20 as it passes the discharge device 150. For this the nozzles are arranged preferably in the longitudinal direction of the thread 20 as will be further explained in relation to FIGS. 3 and 4.

Figure 5A:
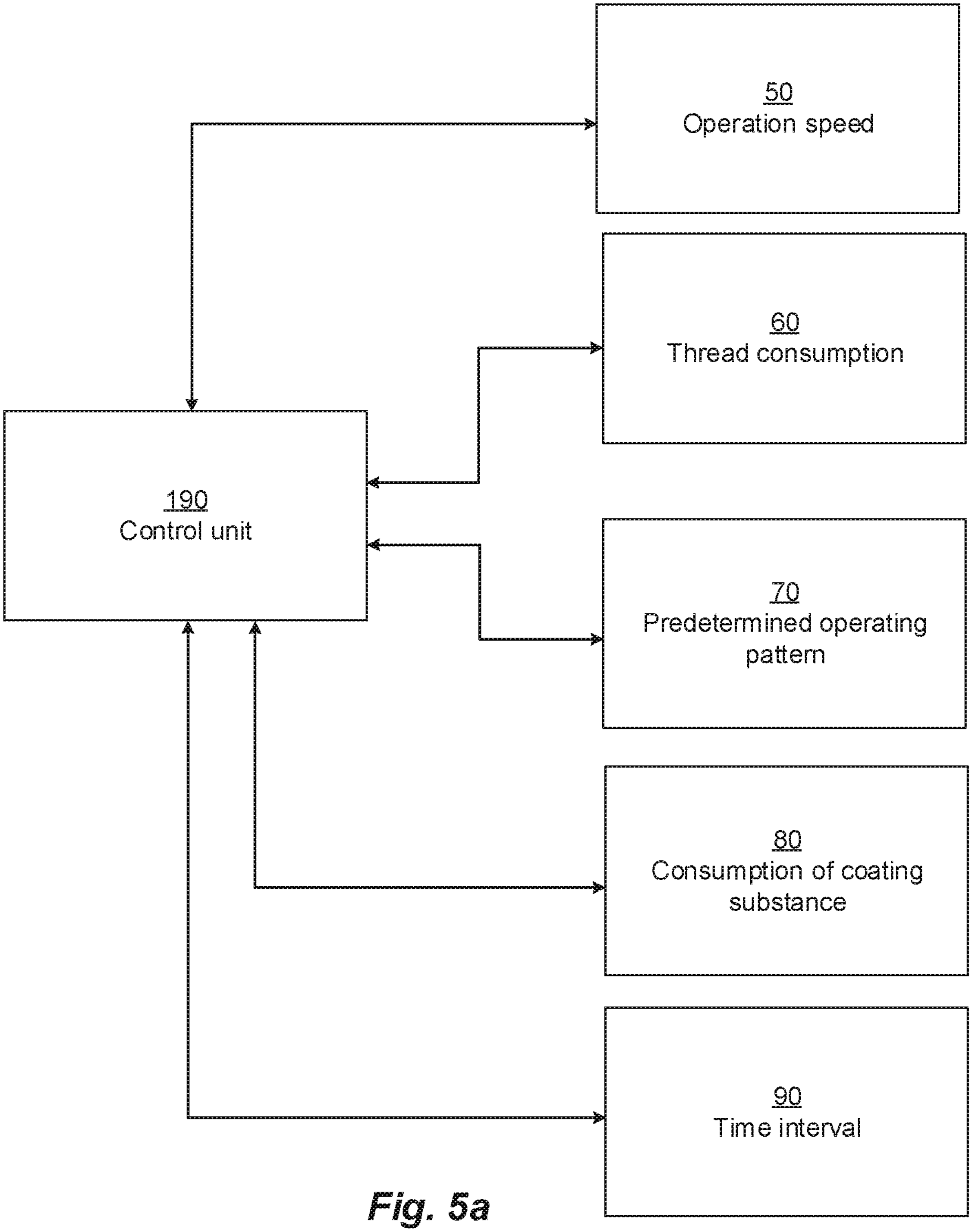
FIG. 5*a* is a schematic view of a part of a treatment unit according to an embodiment.
Figure 5B:
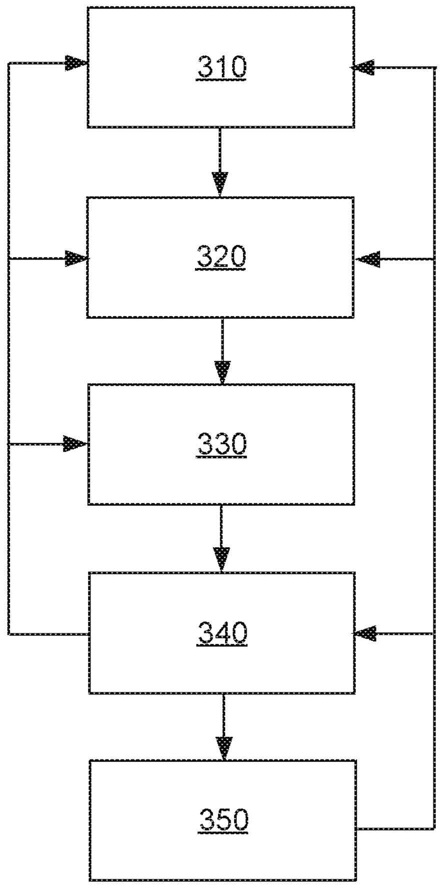
FIG. 5*b* is a schematic view of method according to an embodiment.
Figure 6:
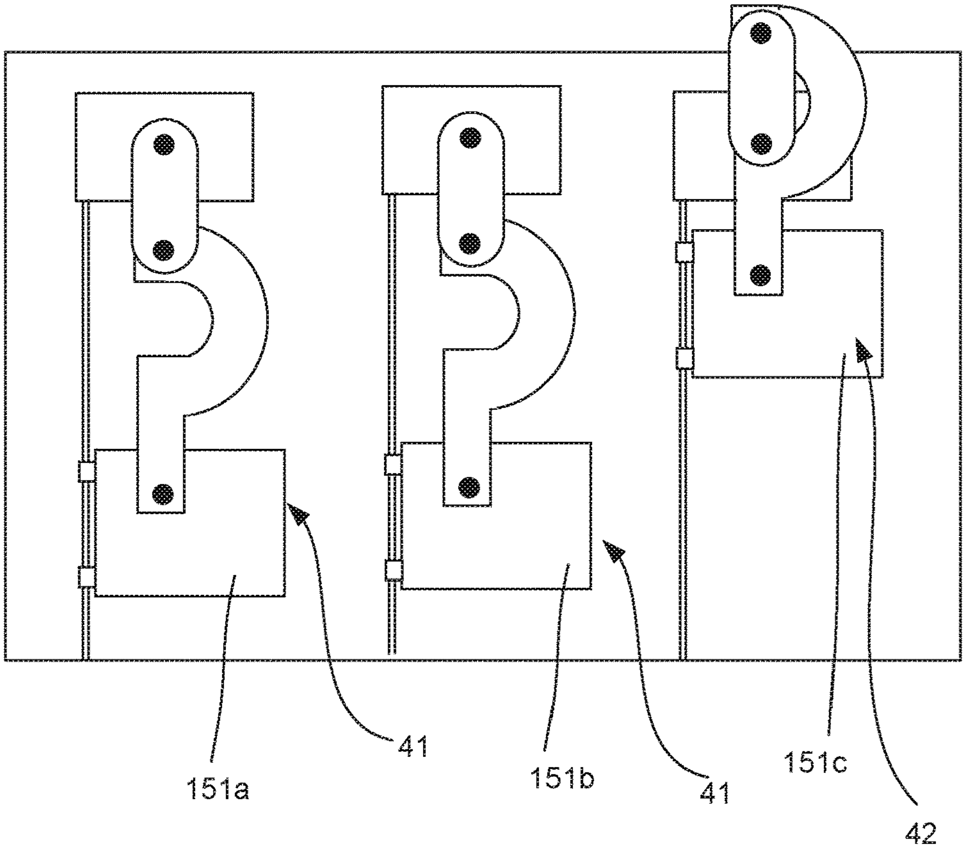
FIG. 6 is a schematic view of a treatment unit with a plurality of drive units according to an embodiment.

The discharge device 150, or parts of the discharge device 150 such as the print head(s) 151*a-d*, may be moveable by means of a drive unit (as shown in FIGS. 5 and 6). Having a drive unit will make it possible to arrange the discharge device 150, or parts of the discharge device 150, in different operating states in order to perform different tasks, such as for example a first state of dispensing a coating substance to a thread and a second state of performing a cleaning session, or other maintenance or idling.

Downstream the discharge device 150 another thread guiding device 160 is provided. The second thread guiding device 160 is cooperating with the first thread guiding device 140 such that the position of the thread 20 is correct during its travel along the discharge device 150. The second thread guiding device 160 may e.g. be in the form of one or more guiding rollers 162, 164, although it may also be designed to induce a rotation of the thread 20 along its longitudinal axis. This extra functionality can provide advantages to the colouring as also will be described below.

The system 10 may further comprise a thread speed sensor (not shown) configured to measure the speed of the thread 20 passing through the system 10.

Moreover, a light detection system (not shown) may be arranged downstream the discharge device 150 along the travel direction of the at least one thread 20. The light detection system is arranged to illuminate the thread 20 in order to receive light which is reflected from the thread 20 when the thread 20 is illuminated. The information gathered from the light detection signal may for example be used to determine the position of the thread in relation to the nozzles 152*a-f*, the width of the thread and/or properties of the thread. This information can in turn for example be used to detect nozzle(s) that are in need of maintenance, that the position of the nozzle(s) needs to be altered and/or detect variations in the coating substance. Additionally, or alternatively, the light detection system may be used to determine different properties of the thread that has been applied with one or several coating substances.

The thread 20 is then fed forward to pass one or more fixation units 170 which are provided in order to fixate the treatment substance to the thread 20. The fixation unit 170 preferably comprises heating means, such as a hot air supply or heated elements, or an UV light source such that the treatment substance, e.g. a colouring substance, is cured or fixated onto the thread 20. As is shown in FIG. 2 the fixation unit 170 may either be arranged horizontally, vertically, or at an angle between horizontally and vertically.

Before exiting the housing 105 the thread 20 can pass a cleaning unit 180, such as an ultrasonic bath, where unwanted particles are removed from the thread 20. As the treatment substance is fixated onto the thread 20, the cleaning unit 180 will leave the treatment substance unaffected.

The treatment unit 100 may further comprise a lubrication unit 185 arranged inside the housing 105. Additional thread buffers and feeders (not shown) may also be included in the treatment unit 100, arranged at various positions in the thread path.

The thread 20 preferably exits the treatment unit 100 through an aperture or similar, whereby the thread 20 is forwarded to an associated thread consuming device, such as an embroidery machine 15 as is shown in FIGS. 1*a-b*.

The thread feeder 130 and the other components engaging with the thread 20 during operation are preferably configured such that the force required to pull the thread 20 from the treatment unit 100, i.e. the pulling force applied by the downstream embroidery machine 15, is approximately the same as if the treatment unit 100 was replaced by prior art thread reels.

A control unit 190 with associated electronics, such as power electronics, communication modules, memories, etc. is also provided. The control unit 190 is connected to the thread feeder 130, the discharge device 150, and the fixation unit 170 for allowing control of the operation of these components. Further, the control unit 190 is configured to controlling operation of the entire treatment unit 100 including the cleaning unit 180, the lubrication unit 185, a disruption of the thread 20, the thread speed at various position along the treatment unit 100, the thread buffers, etc. The control unit 190 may also be configured to receive control signals from one or more components of the treatment unit 100, e.g. control signals for triggering specific control, or other information relating to e.g. thread consumption by the embroidery machine 15.

The control unit 190 may be implemented by any commercially available CPU ("Central Processing Unit"), DSP ("digital signal processor") or any other electronic programmable logic device, or a combination of such processors or other electronic programmable logic device. The control unit 190 may be implemented using instructions that enable hardware functionality, for example, by using executable computer program instructions in a general-purpose or special-purpose processor that may be stored on a computer readable storage medium 192 (disk, memory etc) to be executed by such a processor. The storage medium 192 is preferably in operative communication with the control unit 190.

In one embodiment, a user interface is also provided, preferably via a display 195 arranged at the front end of the housing 105. The display 195 allows a user to interact with the control unit 190 and is thus connected thereto, so that the control parameters of the thread feeder 130, the discharge device 150, the fixation unit 170, etc. may be set depending on process specifications. The display 195 may also preferably be used for alerting the user of critical situations, whereby the display 195 may be used for the control unit 190 to issue alarms or the like.

It should be noted that the components described above may not necessarily be included in the stand-alone treatment unit 100, but instead the components of the treatment unit 100 may be separated into several units, of which at least one unit is a stand-alone unit. Preferably, the stand-alone unit includes at least the at least one discharge device 150.

Figure 3:
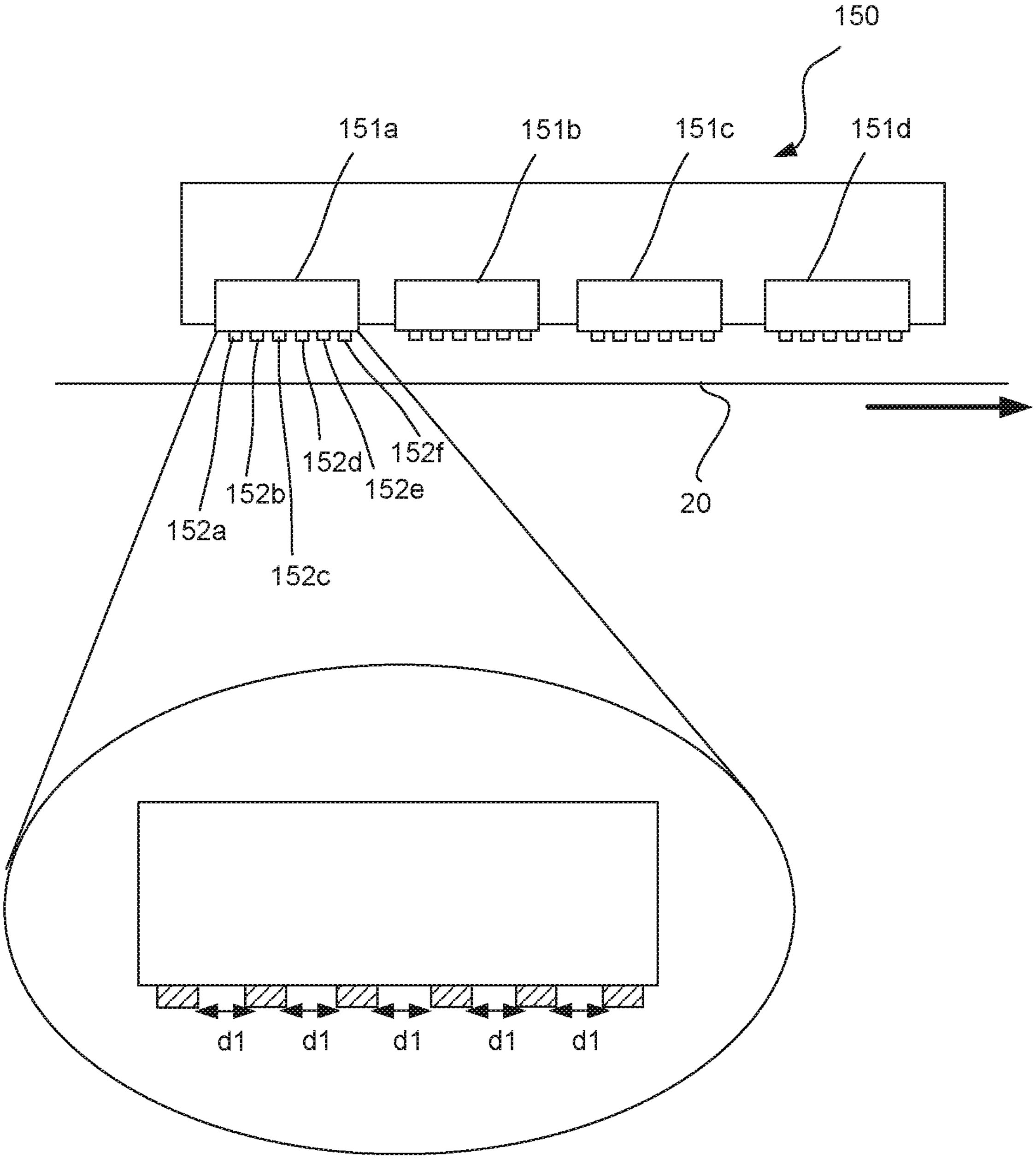
FIG. 3 is a schematic view of a discharge device forming part of a treatment unit.

In FIG. 3 a discharge device 150 is shown, forming part of the treatment unit 100 as described above. The direction of movement of the thread 20 in use is indicated by the solid arrow in FIG. 3. As will soon be described in more detail, the discharge device 150 comprises a plurality of nozzles 152*a-f* arranged at different longitudinal positions (for example spaced by a distance d1) along the thread 20 which passes by the treatment unit 100 during use.

Each nozzle 152*a-f* is arranged to dispense a coating substance, such as ink, onto the thread 20 when the nozzle is activated. The coating substance is absorbed by the thread 20, e.g. at different circumferential positions of the thread 20 when the thread 20 twists about its longitudinal axis. The relative position of two adjacently dispensed droplets of coating substance may be selected such that the droplets will overlap.

The treatment unit 100 comprises one or more discharge devices 150. Each discharge device 150 is preferably formed as a series of ink-jet print heads 151*a-d*, each print head 151*a-d* having one or more nozzle arrays. Each nozzle array typically comprises hundreds or thousands of nozzles. For illustrative purpose only six nozzles 152*a-f* are shown for one print head 151*a-d*; it should however be realized that each nozzle array may be provided with hundreds or thousands of nozzles 152 each. As an example, each print head 151*a-d* may be associated with a single colour; in the shown example, the discharge device 150 has four print heads 151*a-d*, each print head 151*a-d* being associated with a specific colour according to the CMYK standard. However, other colouring models may be used as well.

The exact configuration of the treatment unit 100 may vary. For example, the treatment unit 100 is provided with a single discharge device 150 having a plurality of print heads 151*a-d*. Each print head 151*a-d* is in turn provided with a plurality of nozzles 152*a-f*.

In another embodiment the treatment unit 100 is provided with several discharge devices 150, arranged either in series or in parallel. Each discharge device 150 is then provided with a plurality of print heads 151*a-d*. If serially arranged, the upstream discharge device 150 may have print heads 151*a-d* being associated with one or more colours of a specific colour standard, while the downstream discharge device 150 has print heads 151*a-d* being associated with other colours of the same colour standard. If arranged in parallel, each discharge device 150 may have print heads 151*a-d* being associated with all colours of a specific colour standard, but with different threads 20. For such embodiment, two separate threads 20 can be treated simultaneously and in parallel. Combinations of parallel/serial configurations are of course also possible.

In a yet further embodiment, the discharge device 150 is only having a single print head 151*a-d*; dynamic colouring of the thread 20 would then require several discharge devices 150 of the treatment unit 100.

Each nozzle 152*a-f* may dispense a coating substance having a colour according to the CMYK colour model, where the primary colours are Cyan, Magenta, Yellow, and Black. It may thus be possible to dispense a wide variety of colours onto the thread by activating nozzles 152*a-f* such that the total colouring substance of a specific length of the thread 20 will be a mix of the colouring substances dispensed by the nozzles 152*a-f*. As explained earlier, this is preferably achieved by having several print heads 151*a-d* arranged in series, whereby the nozzles 152*a-f* of a specific print head 151*a-d* are dedicated to a single colour.

In another embodiment, each nozzle 152*a-f* dispenses a coating substance having a colour comprising a mix of two or more primary colours of the CMYK colour model.

The control unit 190 is configured to control the activation of the nozzles 152*a-f* such as the coating substance is emitted onto the thread 20 as it passes through the treatment unit 100, and especially pass the discharge device 150. By such configuration very precise colouring of the thread 20 is possible e.g. in order to provide advanced embroidery patterns, visually extremely sophisticated by means of the colouring provided by the treatment unit 100.

For a colouring operation the control unit 190 receives one or more input signals specifying the desired colour and/or colouring effect. The colour input preferably includes information regarding the exact colour, as well as the longitudinal start and stop positions of the thread 20 for that particular colour. The longitudinal start and stop position could be represented by specific time values if the thread speed is determined.

Figure 4A:
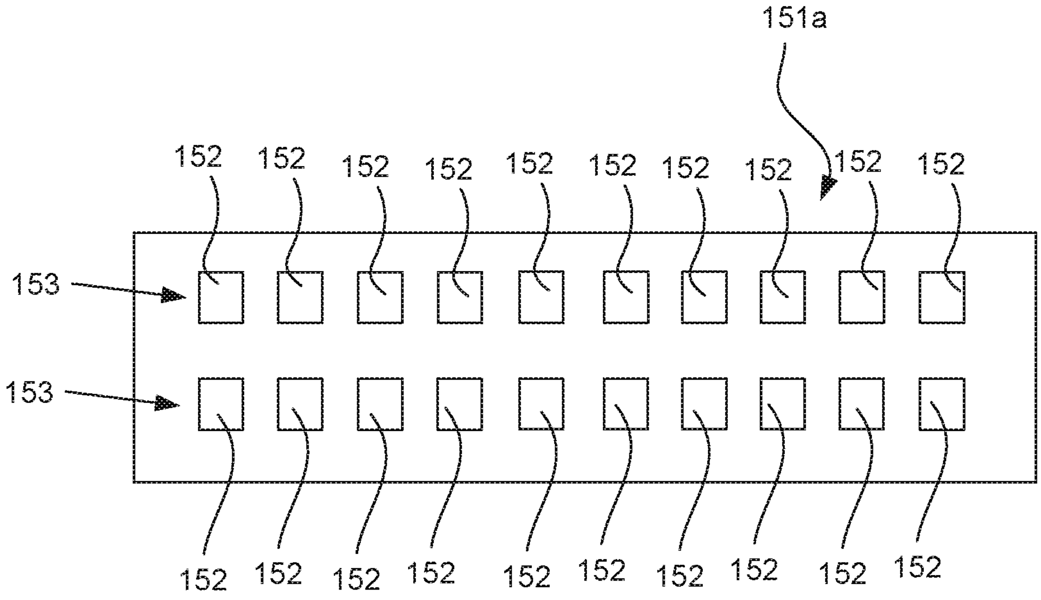
FIG. 4*a* is a schematic top view of a part of a discharge device according to an embodiment.
Figure 4B:
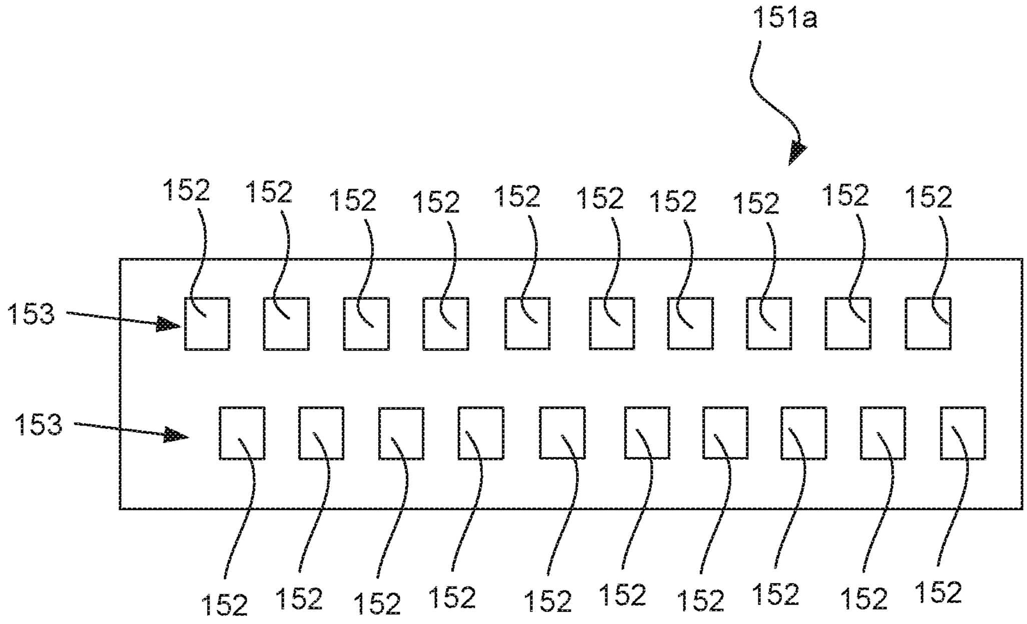
FIG. 4*b* is a schematic top view of a part of a discharge device according to an embodiment.

FIG. 4*a-b* illustrates a respective top view of a print head 151*a*. The print head 151*a* has a planar surface on which the nozzles 152 are arranged. As mentioned earlier, the total number of nozzles 152 of a single print head can be up to several thousands, provided on a print head 151*a* in the size of a couple of centimeters. In the shown example, a far less number of nozzles 152 are shown. The nozzles 152 can be distributed in one or more nozzle arrays 153. In FIG. 4*a*, the nozzles 152 are distributed in two parallel arrays 153. The arrays 153 are aligned with each other, such that nozzles 152 of one array 153 are arranged adjacent a nozzle 152 of the other array 153.

FIG. 4*b* shows a similar example, however there is a longitudinal offset between the two arrays 153.

In an exemplifying embodiment, the system 10 comprises a discharge device 150 having four different colours device and is connected to a thread consuming device 15, such as an embroidery machine. In this embodiment, the green colour is mixed as a combination of cyan and yellow, while black and magenta are not currently used. The green colour is planned to be used in 8000 stitches, and after a sequence of green the system will switch to colour the thread brown. Hence, in this example, if the system 10 is running in a speed of 800 RPM, black and magenta will not be used in 10 minutes.

It is undesirable to stop the embroidery machine 15 to do a cleaning routine of the nozzles 152*a-f* as this usually requires an operator manually to start the embroidery machine 15. This affects the productivity in a negative manner. It is therefore desirable to be able to perform necessary maintenance on the colours that are currently unused, so that they are ready to be used once it is their turn.

The inventors of the present invention have after insightful reasoning realized that it would be beneficial to be able to perform maintenance on one or several discharge devices 150 and/or one or several print heads 151*a-d* without stopping the thread consumption of the thread consuming device 15. By for example knowing the predetermined pattern to be created on the substrate it is possible to estimate the time when one or more nozzles 152*a-f* will or will not be used. This information can then be used to perform maintenance on nozzles that are not currently being used and that are not scheduled to be used for a predetermined time interval.

How often the nozzles are in need of maintenance are dependent on several factors. The maintenance may for example be dependent on the time which the nozzle is exposed to air, if the nozzles are active dispensing a coating substance or not, the frequency of the dispensing, temperature and/or humidity. In most situations, the most important factor is the time that the nozzle is exposed to air, i.e. the time which the nozzle is capable of being exposed to air without (partly or fully) drying. This is related to the frequency of the dispensing.

Determine Maintenance

It would thus be beneficial to have a system 10 which is configured to determine if a maintenance sequence is to be performed on at least the first print head 151*a*, and to perform said maintenance without stopping the thread consumption of the thread consuming device 15. A maintenance sequence is to be performed when one or several print heads 151*a-d* are in need of maintenance and/or if it is a suitable time to perform maintenance of the one or several print heads 151*a-d*.

The control unit 190 may determine if a maintenance sequence is to be performed based on one or a plurality of factors, as seen in FIG. 5*a*. Such factors may be the predetermined pattern 70 to be created on the substrate, current operating speed 50 of the thread consuming device 15, estimated consumption of the coating substance 80, estimated current thread consumption 60, estimated upcoming thread consumption 60 and/or time intervals 90. The following factors will now be described more in detail.

The control unit 190 may further be configured to receive a predetermined pattern to be created on the substrate. The predetermined pattern may comprise information relating to the number of stitches, the length of the stitches, the stitch pattern, the colour scheme of the pattern, etc.

The control unit 190 may further be configured to analyse the current operating speed (for example RPM) of the thread consuming unit 15.

The control unit 190 may further be configured to analyse the estimated consumption of the coating substance.

The control unit 190 may further be configured to analyse the current and/or the upcoming thread consumption in order to determine when the next event will occur. The event may for example be a colour change. The thread consumption may be based on operation data and at least one parameter being related to one or more thread consumption parameter. In one embodiment the control unit 190 is configured to use at least one parameter being related to one or more thread consumption parameters to evaluate the thread consumption. The thread consumption parameters comprise parameters related to the substrate or parameters related to the stitches. The substrate parameters may for example be related to different parameters of the substrate. For example, the substrate parameters may relate to the thickness of the substrate, the elasticity of the substrate, and/or the placement of the substrate in the thread consuming device 15, or any combination thereof. The stitches parameters may be related to the tension of the thread 20, the angle to which the thread 20 is applied to the substrate, the angle of at least the last stitch, features related to underlying stitches, or any combination thereof.

A method for evaluating current and/or the upcoming thread consumption will now be described more in detail with reference to FIG. 5*b*. The control unit 190 is configured to receive or generate 310 operation data and receive or generate 320 at least one parameter being related to one or more thread consumption parameters 40. Based on the operation data and the at least one parameter being related to one or more thread consumption parameters, the control unit 190 is configured to evaluate 330 the thread consumption of the thread consuming device 15.

The control unit 190 may further be configured to perform 340 a simulation of the thread consumption and use this simulation data to evaluate the thread consumption, either by using the simulation data to increase the accuracy of the operation data and/or one or more thread consumption parameters and/or to increase the accuracy in the evaluation of the thread consumption.

In one embodiment, the control unit 190 is further configured to use 350 stored data in order to further increase the accuracy of the simulation data and/or to further increase the accuracy of the operation data and/or one or more thread consumption parameters.

In one embodiment the control unit 190 is configured to determine if a maintenance sequence is to be performed based on the current operating speed and the predetermined pattern to be created on the substrate. In a preferred embodiment, the determination is also based on the current and/or the upcoming thread consumption of the thread consuming device 15. However, it should be noted that any combination of the different factors could be used to determine if a maintenance sequence is to be performed.

The control unit 190 may further be configured to determine if a maintenance sequence is to be performed based on a substance queue. The substance queue, which for example may be a colour queue, comprises the upcoming substances that are to be activated and applied to the at least one thread 20. Based on the substance queue, it is possible to plan the maintenance to the possible most appropriate occasions.

The control unit 190 may further be configured to alter the number of active nozzles 152*a-f* based on the operation of the thread consuming device 15 and/or the operation of the treatment unit 100. When the operation speed is low and the colour to be created is light, it may be preferred if a fewer number of nozzles are used. A lower frequency in dispensing a coating substance, will increase the time when the nozzles are unused and thus increase the need of maintenance. Hence, a higher frequency of dispensing a coating substance will require less maintenance (and more specifically less spitting, as will be described more in detail later on). In one exemplary embodiment, the number of nozzles are reduced from 236 to 96 when the operating speed is below a threshold value.

In one embodiment, the control unit 190 is configured to determine if there is a suitable time slot in the colour queue so that a maintenance sequence can be performed on one or several nozzles.

The control unit 190 is configured to determine if there is a time slot that is sufficiently large so that a desired maintenance sequence can be performed. Additionally or alternatively, the control unit 190 is configured to determine if there is a time slot that is so long that the nozzles (and its print head) is to be put in a capping position (i.e. a position where the nozzles are not dispensing a coating, and are arranged in a position where they are hermetic sealed from contaminants and drying, as will be described more later on). The nozzles may be put in a maintenance sequence before and after being put in a capping position.

Once the system 10 has identified that a maintenance sequence is to be performed for one or more print heads 151*a-d*, the system schedule such a sequence. The system 10 will then initiates the sequence, either directly or after the nozzles have been arranged in a capping position.

Separate Movements

In a system comprising at least two discharge devices 150, the system 10 may be configured to control the movement of the individual discharge devices 150 so that one or several discharge devices 150 are arranged in a maintenance position. The system 10, comprising at least two print heads 151*a-d* may, additionally or alternatively, be configured to control the movement of the individual print heads 151*a-d* so that one or several print heads 151*a-d* are arranged in the maintenance position.

FIG. 6 shows a part of a treatment unit 100 having three print heads 151*a-c* that are movably arranged between an operational position (first position) and a maintenance position (second position). In this example the movement, and thus the maintenance, is performed on at least one print head 151*a-c*. However, the following description is also applicable to the situation where the whole discharge device(s) are moved.

In one embodiment the system 10 is configured to move one print head 151*c* between a first and a second position. The first position 41 may be one or more operational positions where the discharge device 150 is configured to dispense one or more coating substances onto the at least one thread 20. In one embodiment, this position corresponds to when the nozzles 152*a-f* are aligned above the at least one thread 20.

The second position 42 may be one or more positions where the discharge device 150 is configured to no longer dispense one or more coating substances onto the at least one thread 20. This position 42 is thus used during maintenance (such as cleaning, service, etc.).

Once the system 10 has identified that a maintenance sequence is to be performed for one or more print heads 151*a-d*, the system initiates said sequence by moving the print head(s) 151*c* to be cleaned to the second position. The movement is preferably performed by a drive unit 32, as will be described more in detail with reference to FIG. 6. While the print head 151*c* is in the second position, a maintenance sequence is performed on said print head. During the maintenance sequence, the print head 151*c*, that has been moved to the second position, is deactivated from dispensing a coating substance onto the at least one thread 20. The deactivation is preferably performed as soon as the print head 151*c* moves away from the operating position towards the second position.

Since the print heads 151*a-c* are movable in relation to each other, one or more of the print heads 151*c* may be arranged in a second position, for performing maintenance, while one or more print heads 151*a-b* are arranged in a first position, dispensing one or more coating substances to the thread 20. Once the maintenance sequence is performed on the print head 151*c*, the print head 151*c* is moved back to the first position.

In one embodiment, where the print head 151*a-d* comprises two or more nozzle arrays 153, the control unit 190 is configured to alter the active nozzle arrays 153 of a printer head 151*a-d*. Hence, if the control unit 190 determines that a nozzle arrays 153 is in need of maintenance, the printer head is moved such that said nozzle arrays 153 can be cleaned while the other nozzle row(s) of the same printer head 151*a-d* is activated. A nozzle array 153 of the printer head 151*a-d* can thus be cleaned while another nozzle array 153 of the same printer head 151*a-d* is dispensing coating substance onto one or more threads. The print head 151*a-d* may thus comprise active and passive nozzle array 153, where a maintenance sequence is performed on the passive nozzle array(s) and the passive nozzle array(s) are in an operational position, dispensing coating substance. In one embodiment, the maintenance sequence comprises the step of spitting, where the nozzles 152*a-f* are forced to dispense a substance in a short time interval. The spitting process does not require any other component, and can thus be performed in a very quick and efficient process. This is beneficial since spitting is the form of maintenance that is most often needed in the system 10.

It should be noted that one print head, or several print heads, could be arranged in an operation position at the same time as one or several print heads are parked in a capped position, such as an intermediate position, where no maintenance sequence is performed.

Drive Unit

Figure 7:
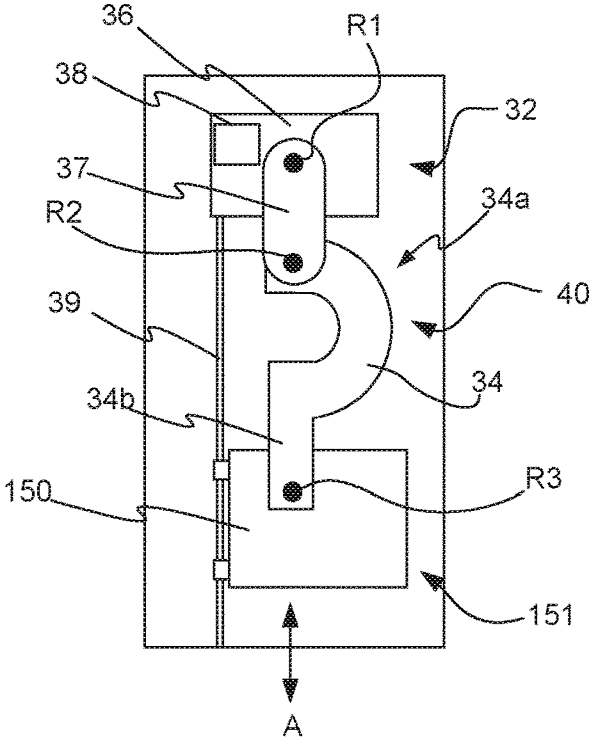
FIG. 7 is a schematic view of a treatment unit with a of drive unit according to an embodiment.

The movement of the print heads 151*a-c* may be achieved by a drive unit 32, as already been described briefly above. One exemplary embodiment of a drive unit 32 is shown in FIG. 7. However, other types of drive unit are also possible.

For example, the drive unit may be construction comprising a thread rod being arranged with a nut or ball screw that is configured to move the print head between the first and the second position.

Now turning to FIG. 7 illustrating an exemplary embodiment of a drive unit 32 of the treatment unit 100. The drive unit 32 is configured to move the discharge device 150 and its associated print head(s) 151*a-d* between a first position 41 and second position 42 relative to at least one thread 20. The movement is preferably along the axis of movement for the drive unit 32. This may be performed by means of a mechanism 40, also referred to as a transmission 40, having different transmission ratios during the motion from the first position 41 towards the second position 42.

As seen in FIG. 6, the drive unit 32 is connected to the discharge device 150, for example to a print head 151*a-d*, by means of an actuator 34 and a crank 37. The actuator 34 and the crank 37 together form a transmission mechanism 40. The crank 37 is in the shape of a lever arm, having one end connected to a rotational axis R1 of an electric motor 36 of the drive unit 32, while the other end is pivotally connected to the actuator 34 at a rotational axis R2. The actuator 34 has an opposite end which in turn is pivotally connected to the discharge device 150 at a rotational axis R3. The transmission ratio can be seen as the correlation between the rotational movement of the crank 37, or the electric motor 36 of the drive unit 32, and the linear movement of the discharge device 150. Hence, the transmission ratio is the ratio of input rotation, to output linear translation of the discharge device 150. A low transmission ratio thus implies that a certain rotational movement input from the drive unit 32 or the crank 37 results in a small linear movement of the discharge device 150, while the opposite is true for a high transmission ratio.

The actuator 34 connects the crank 37 of the motor 36 to the discharge device 150. The actuator 34 may comprise a connecting rod having a curved portion 34*a* and a straight portion 34*b*; the curved portion 34*a* connects to the crank 37, while the straight portion 34*b* connects to the discharge device 150. The transmission 40 is configured to transform a rotational movement of the crank 37 to a linear motion of the discharge device 150. The actuator 34 is designed such that the transmission ratio during the motion between the idle position 41 and the operational position 42 is lower close to the end positions than between these positions. This will increase accuracy of the movement when aligning the discharge device 150 to the thread 20, as very precise movement is advantageous. Increased motion resolution is thereby achieved.

The motor 36 may for example be a step motor or a DC motor. In the embodiment where the motor 36 is a DC motor, it may be advantageous if the drive unit 32 further comprises a position sensor 38. The position sensor 38 is configured to determine the position of the drive unit 32. The position sensor 38 is preferably in communication with the control unit 190. Regardless of the type of motor 36 used, a position sensor 38 may be configured to determine the position of the drive unit 32 in order to improve the accuracy of the system 10, and in particular to determine the position of the discharge device 150. For example, a specific angular position of the motor may be correlated with a specific linear position of the discharge device 150.

The component to be moved, i.e. the print head 151*a-d*, is movable along an axis of movement, preferably perpendicular to the movement of the thread 20. In order to guide this movement, the drive unit 32 may further comprise a guiding member 39. The guiding member 39 may for instance be a guide rail or a groove. The first and/or second positions 41, 42 may be located at extreme ends of the axis of movement A.

Figure 8:
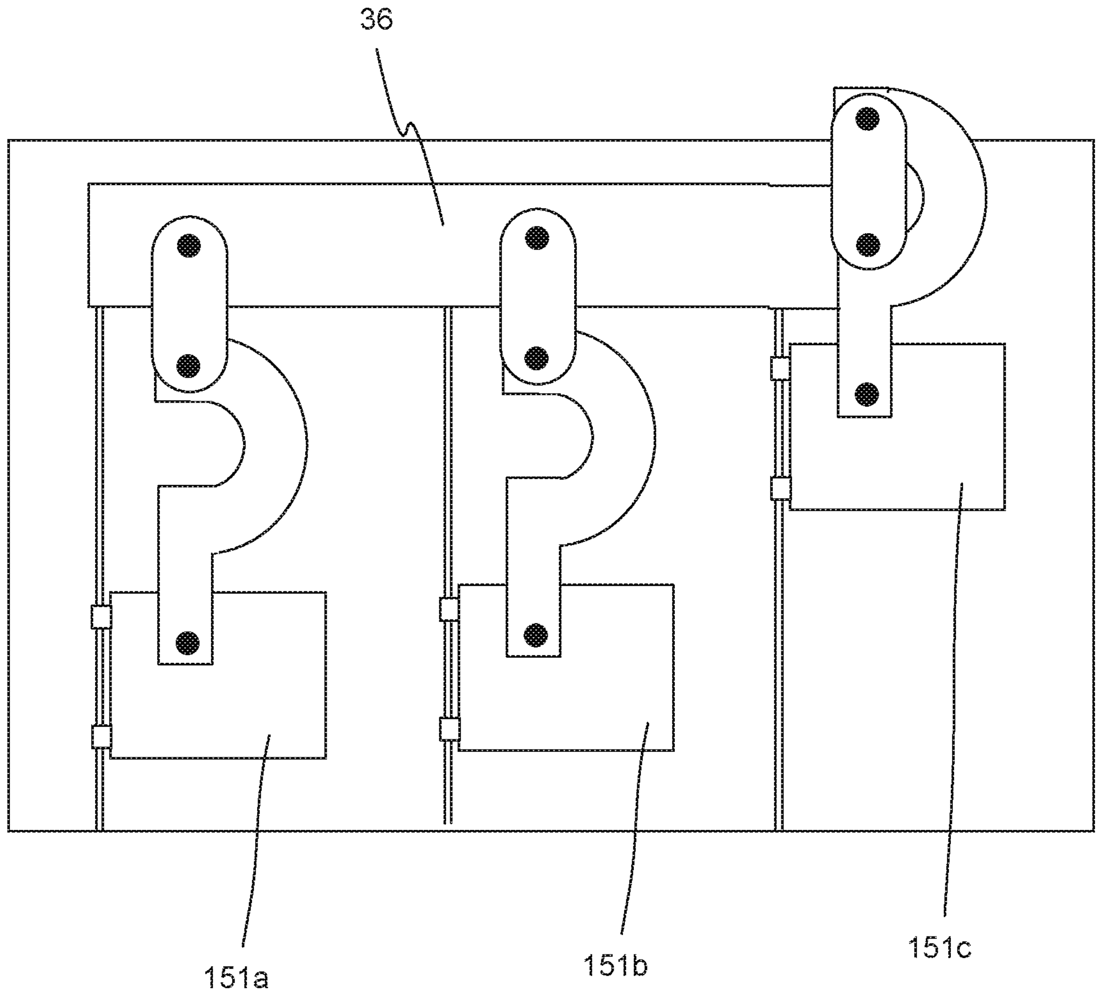
FIG. 8 is a schematic view of a treatment unit with a plurality of drive units having one common motor according to an embodiment.
Figure 9A:
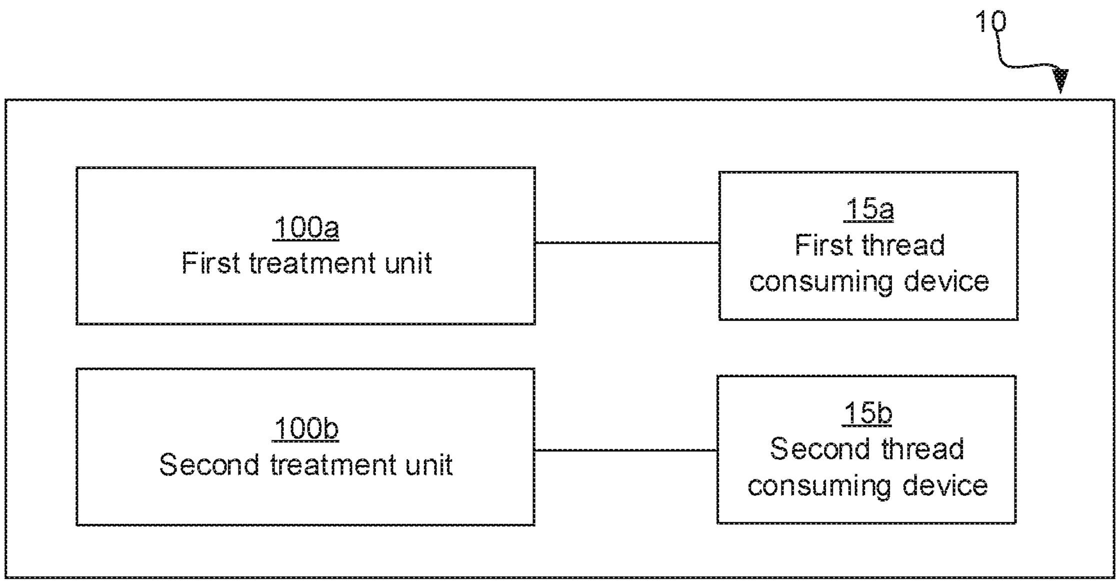
FIG. 9*a* is a schematic view of a system according to an embodiment.
Figure 9B:
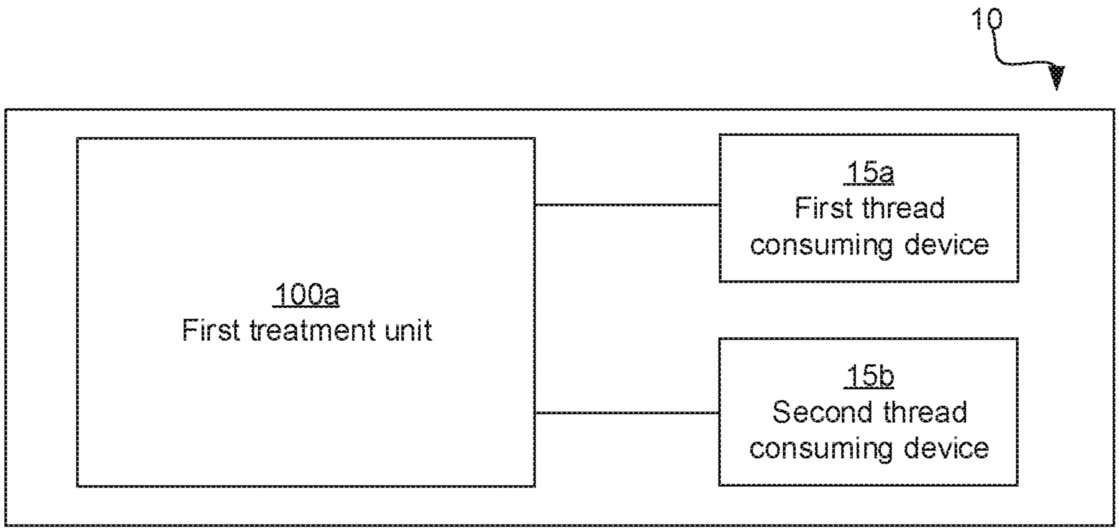
FIG. 9*b* is a schematic view of a system according to an embodiment.

In yet one embodiment, a plurality of drive units 32 share a common motor 36. This is shown in FIG. 8. The motor 36 may be of the same kind as has been described above. The one motor 36 is configured to control the operation of several drive units 32. By only using one motors it is possible to perform maintenance on one or more heads synchronously. In one embodiment, the maintenance is designed to be able to perform a maintenance routine on one or several print heads simultaneously. Any combination of print heads can be possible. In one embodiment one motor is used to control two drive units (and thus two print heads 151*a-d*).

Maintenance Sequence

A maintenance sequence may comprise several steps and process, and the following description of a maintenance sequence should not be seen as limiting but merely a couple of examples as different kinds of maintenance steps are known to a person skilled in the art. A cleaning cycle may for example comprise one or more of spitting, purging, air release, wiping, etc. In one exemplified sequence the steps comprise driving to home mode, capping, open an air vent valve, suck ink through the nozzles, close the vent valve, suck ink from the capping, pump ink with ink supply pump, wiping, suck ink from the capping, wiping, spitting, and finally suck ink from the capping. It should be noted that the sequences that are performed may be predetermined or varied depending on how the previous steps or sets of steps in the sequence have elapsed. Moreover, times between each action may be fixed or altered during the process, A buffer system (as will be described below) or any similar system providing a buffering effect is filled with a suitable amount of treated thread. This makes it possible to stop the thread, so that the discharge device 150 (or part of it) can stop dispensing coating.

Once the print head(s) is determined to be cleaned and/or serviced, and the thread is stopped, the print head(s) is moved into a maintenance position, or a capping position. The capping position is arranged with a capping system which hermetic seals the nozzles from contaminants and drying. The capping system may further comprise a pumping unit that draws a vacuum on the print head. When the print head is moving towards the capping position its vault can open the caps belonging to that head. Only the vaults for the print head that is selected for the maintenance routine will be opened. The vaults belonging to the heads that are in printing, operating, position will thus remain closed. This will prevent air leakage and will make sure that the correct cleaning is made on all heads included in the current maintenance routine. The same motor as have been described above, or a dedicated actuator, is used to open the vaults in order to clean the one or more print heads.

The maintenance sequence may comprise one or more cleaning steps. The maintenance sequence may comprise the step of spitting, where the nozzles 152*a-f* are forced to dispense a substance in a short time interval. Hence, during spitting, a number of drops of coating substance, such as ink, is dispensed through each of the nozzles in question. This activates the nozzles 152*a-f* and thus prevents the nozzles from drying out, clogging, jetout, and/or prevents the nozzles from dispensing the coating in an undesired angle due to lack of cleaning Additionally, or alternatively, the maintenance sequence comprises the step of wiping. The wiping step may comprise a wiper that wipes the print head surface to remove ink residue, as well as any dust or other debris that have collected on the print head. The wiper(s) may be of an elastomeric material, for instance a nitrile rubber, ethylene polypropylene diene monomer (EPDM) elastomer, or other types of rubber-like materials known to those skilled in the art. The wiping action is usually achieved by moving the print heads across the wipers or by moving the wipers across the stationary print heads. The same motor as have been described above, or a dedicated motor, is used to move the wiper in order to clean the one or more print heads.

Buffer System

The system 10 may further comprise a buffer system. The buffer system may be used together with the determination step if a maintenance sequence is to be performed and/or together with the movement of the individual print heads and/or discharge device 15. However, the buffer system may also be used with systems 10 where these features are not present.

The buffer system comprises at least one thread buffer unit. The thread buffer unit may be in the form of a buffer arm having one end at which the thread is guided. The opposite end may be pivotally attached to a support, such that the position of the thread guiding end may be adjusted. The force applied to the buffer arm will consequently determine the tension of the thread.

The thread buffer unit will allow coated thread to buffer under tension. The force applied to the thread by the thread buffer unit determines the thread tension, which in most cases will vary along the thread path. Hence, the exact construction of the thread buffer may provide different tensions at different positions along the thread. In an alternative embodiment, the thread buffer unit is constructed so that the force applied to the thread is determined by gravity, by spring(s), combination of gravity and spring(s) or any other device capable of controlling the thread tension. The thread tension is controlled by adjusting the force in the thread buffer unit which pulls the thread through the treatment unit as described above.

The thread buffer unit is preferably arranged downstream the at least one discharge device 150. In one embodiment, the buffer is filled up just before a cleaning or maintenance process starts, after which the thread is stopped by the thread feeder 130. In yet one embodiment, the thread buffer is always striving to be sufficiently filled. The thread feeder 130 is preferably arranged upstream of the discharge device 150. The thread arranged in conjunction with the discharge device 150 is thus stopped. During the time the thread is stopped, the discharge device 150, or one or more of its print heads 151*a-d*, are cleaned. During this cleaning process, when the thread is held still, the thread consuming device 15 is using the thread from the buffer. When the cleaning process is finished, the thread will start moving again.

The amount of thread in the buffer may be adjusted based on the expected thread consumption during the planned cleaning process. The expected thread consumption may preferably take into account any increase in speed of the system 10.

Although the present invention has been mainly described with reference to a system comprising one treatment unit 100 and one thread consuming device 15, it should be understood by a person skilled in the art that the inventive features could be applied to other systems as well. FIGS. 8*a-b* illustrates two examples of such alternative systems.

In FIG. 8*a*, the system 10 comprises a first and a second treatment unit 100*a*, 100*b* as well as a first and a second thread consuming device 15*a-b*. Each treatment unit 100*a*, 100*b* is controlling and performing the operations on each thread consuming device 15*a-b*. It should be noted that the first and second treatment unit 100*a*, although being separated may share one or more components. In one embodiment, the control unit 190 is arranged as a separate unit from the first and second treatment unit 100*a*, 100*b* and one control unit 190 is thus configured to control the operation of both treatment units 100*a*, 100*b* and correspondingly the operation of both thread consuming devices 15*a-b*.

In FIG. 8*b*, the system 10 comprises one treatment unit 100*a* and a first and a second thread consuming device 15*a-b*. In this embodiment, one treatment unit 100*a* is configured to control and perform the operation of the two thread consuming devices 15*a-b*.

It should be noted that although only two treatment units and two thread consuming devices are shown in FIG. 8*a*, and only one treatment unit and two thread consuming devices are shown in FIG. 8*b*, it should be understood that any reasonable number of treatment units and/or thread consuming devices could be present in the system 10.

In addition to, or alternatively to, having a buffer system, the system 10 could comprise a double the entire set of print heads (and possibly double the entire set of discharge devices 150). Having double set of print heads allows the system 10 to alternate between the two sets. This might remove the need of a buffer since the thread 20 never would have to be still. The control unit 190 is thus arranged to alter the activation between the two sets of print heads. If it is determined that a maintenance sequence is to be performed on at least one print head of the first set, the control unit 190 is configured to alter perform a maintenance sequence on that print head, and possibly on all print heads of the first set, while activating the second set of print heads to dispense coating onto the thread 20. Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

What is claimed is:

1. A system for in-line treatment of thread, the system comprising:

a treatment unit comprising at least a first print head and a second print head, each being configured to dispense one or more coating substances onto the at least one thread; and a control unit configured to determine if a maintenance sequence is to be performed on at least the first print head and configured to schedule said maintenance sequence, and if the control unit determines that the maintenance sequence is to be performed, the control unit schedules said maintenance sequence on at least the first print head; and a thread buffer system being arranged downstream the at least two print heads, wherein the control unit is further configured fill up the thread buffer system when it is determined that the maintenance sequence is to be performed.

2. The system according to claim 1, wherein the control unit is configured to:

receive a current operating speed of a thread consuming device, and the determining if the maintenance sequence is to be performed is at least based on said current operating speed.

3. The system according to claim 1, wherein the control unit is further configured to:

receive a thread consumption of a thread consuming device, and the determining if the maintenance sequence is to be performed is at least based on said thread consumption.

4. The system according to claim 1, wherein the control unit is further configured to control at least one of the first print head and the second print head to be arranged in an operation mode, simultaneously with being arranged in a maintenance mode.

5. The system according to claim 1, wherein the determining if the maintenance sequence is to be performed is at least based on a predetermined operating pattern.

6. The system according to claim 1, wherein the determining if the maintenance sequence is to be performed is at least based on an estimated consumption of the coating substance.

7. The system according to claim 1, wherein the control unit is further configured to determine a time interval for said maintenance, and to determine if the maintenance sequence is to be performed at least based on said time interval.

8. The system according to claim 1, wherein the maintenance sequence is performed without stopping a thread consumption of the thread consuming device.

9. The system according to claim 1, wherein the control unit is configured to perform the maintenance sequence of at least the first print head by moving said first print head from a first position to a second position and is configured to deactivate said first print head from dispensing the coating substance onto the at least one thread.

10. The system according to claim 9, wherein at least the second print head is arranged in the first position while at least the first print head is arranged in the second position.

11. The system according to claim 9, wherein the first position is an operational position and the second position is a maintenance position.

12. The system according to claim 1, wherein each of the first print head and the second print head comprises a plurality of nozzles arranged at different positions relative the at least one thread, said at least one thread being in motion in use, and each nozzle being configured to dispense one or more coating substances onto the at least one thread when activated.

13. The system according to claim 12, wherein the control unit is further configured to alter the number of active nozzles based on the current required flow rate of the one or more coating substances.

14. The system according to claim 12, wherein the control unit is further configured to alter the number of active nozzles based on desired visual appearance of the thread.

15. The system according to claim 12, wherein the nozzles are inkjet nozzles.

16. The system according to claim 1, further comprising a thread consuming device.

17. The system according to claim 16, wherein the thread consuming device is an embroidery machine, a sewing machine, a knitting machine, a weaving machine, a tufting machine, a thread winding machine, and or any combination thereof.

18. The system according to claim 1, wherein the system further comprises a thread feeder arranged upstream of the print heads and wherein the control unit is configured to stop the thread feeder once the control unit has determined that the maintenance sequence is to be performed.

19. The system according to claim 1, wherein during the maintenance sequence, the thread consuming device is consuming thread from the thread buffer system.

20. A method for in-line treatment of at least one thread in a thread consuming device, comprising:

providing a treatment unit comprising at least a first print head and a second print head;

providing a control unit in communication with the first print head and the second print head;

providing a thread buffer system being arranged downstream the first print head and the second print head;

dispensing, via at least one of the first print head and the second print head, one or more coating substances onto at least one thread;

determining, via the control unit, if a maintenance sequence is to be performed on at least the first print head;

scheduling, via the control unit, said maintenance sequence on at least the first print head; and the control unit filling up the thread buffer system when it is determined that the maintenance sequence is to be performed.

* * * * *